(No Model.) P. H. BRACHER. 2 Sheets—Sheet 1.
MACHINE FOR CRUSHING AND MIXING GRANULAR AND PULVERULENT MATERIAL.

No. 250,197. Patented Nov. 29, 1881.

Witnesses

Inventor.

P. H. Bracher
By P. T. Dodge, atty.

(No Model.) P. H. BRACHER. 2 Sheets—Sheet 2.
MACHINE FOR CRUSHING AND MIXING GRANULAR AND PULVERULENT MATERIAL.
No. 250,197. Patented Nov. 29, 1881.
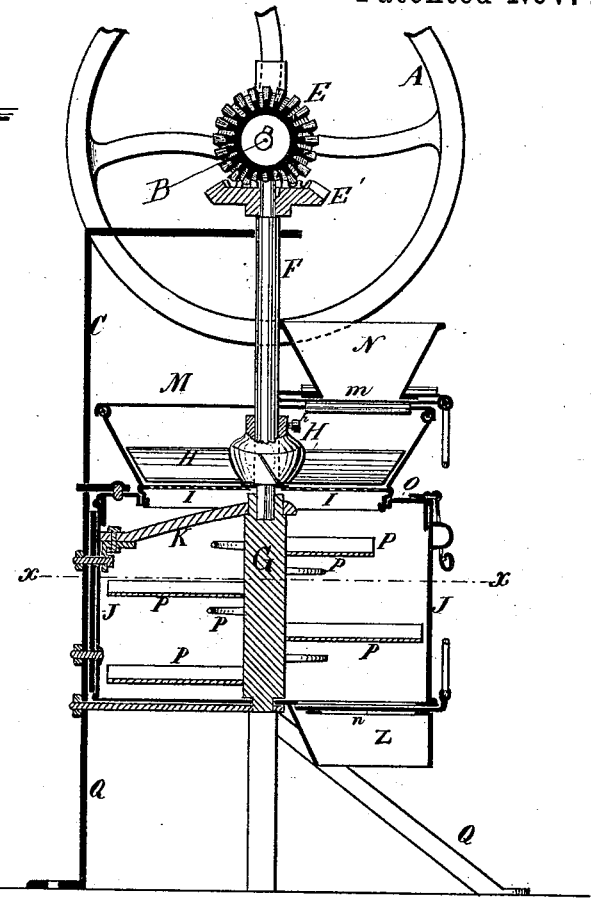
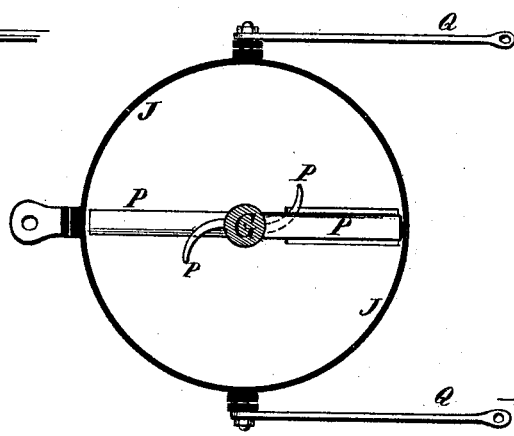
Witnesses.
Inventor.
P. H. Bracher
By P. T. Dodge
Atty

UNITED STATES PATENT OFFICE.

PHILIP HENRY BRACHER, OF WINCANTON, COUNTY OF SOMERSET, ENGLAND.

MACHINE FOR CRUSHING AND MIXING GRANULAR AND PULVERULENT MATERIAL.

SPECIFICATION forming part of Letters Patent No. 250,197, dated November 29, 1881.

Application filed September 12, 1881. (No model.) Patented in England January 15, 1879.

*To all whom it may concern:*

Be it known that I, PHILIP HENRY BRACHER, of Wincanton, in the county of Somerset, England, have invented certain new and useful Improvements in Machines for Crushing and Mixing Granular and Pulverulent Material; and I do hereby declare that the following is a full, clear, and exact description of the invention, which will enable others skilled in the art to which it appertains to make and use the same.

This invention has for its object the crushing of soft lumps and the mixing of sugar, coffee, and other granular or pulverulent materials. It is best described by aid of the accompanying drawings, in which—

Figure 1:
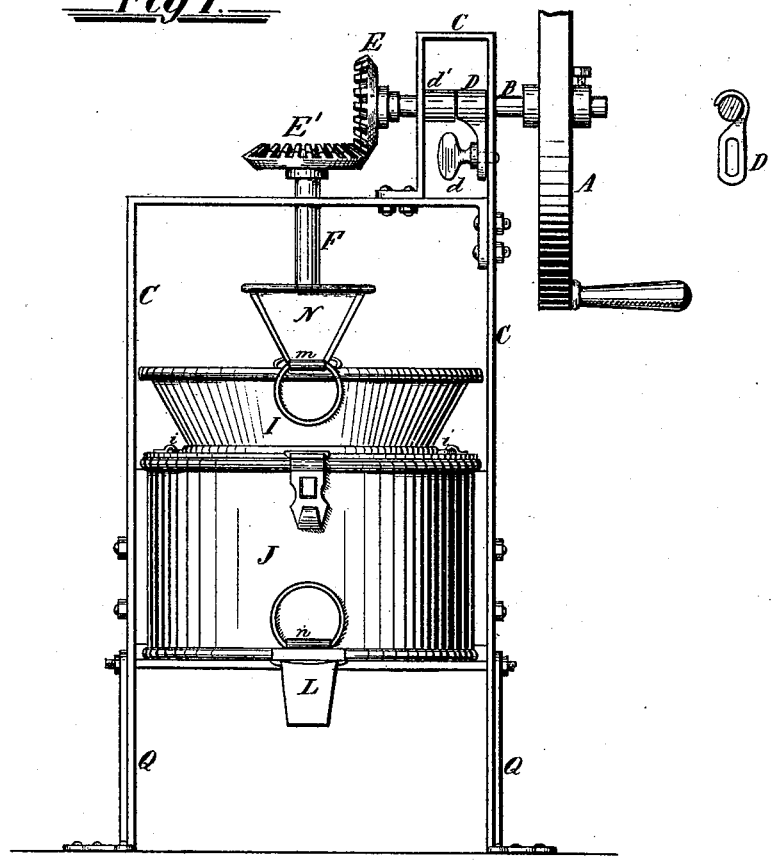
Figure 2:
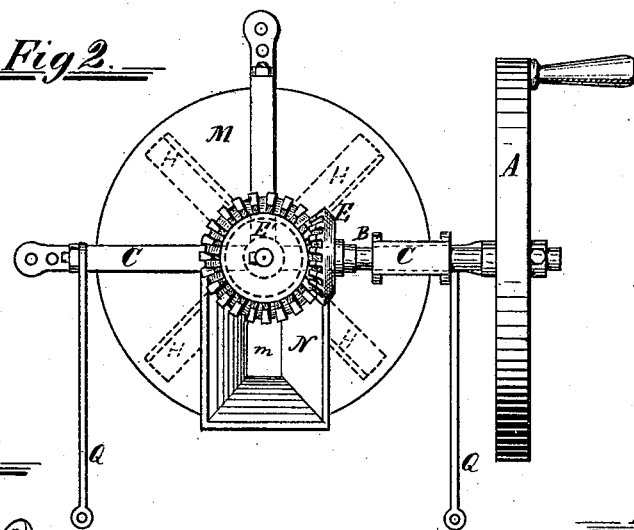

Figure 1 is an elevation; Fig. 2, a plan; Fig. 3, vertical section, and Fig. 4 horizontal section through $x$ $x$, Fig. 3.

In these A is the fly-wheel or hand-wheel; B, driving-shaft carrying same; C, bracket or frame; D, catch fixed to frame by screw $d$, which passes through a vertical slot in D, allowing D to slide vertically on screw $d$ when not held tight by said screw. D clasps the shaft between the frame and collar $d'$. The object of this catch is to keep the shaft in such position that the gear-wheel E keyed thereto shall gear into wheel E'. If, however, it is desired to take the shaft F, hereinafter described, out of its bearings, then the screw $d$ is loosened, the catch D raised sufficiently to clear the shaft, then turned back and allowed to hang down, the shaft pulled forward till collar $d'$ comes against the frame. The wheels E E' are thus pulled out of gear and shaft F is raised.

F is a vertical shaft carrying gear-wheel E' keyed thereto, socketed with a square tenon in shaft G.

G is a shaft held in bearings or working in a socket in the bottom of case J and in bearings in stationary cross-piece K.

H is a rotary crusher and feeder consisting of a hub provided with a series of radial inclined blades or arms, secured to the vertical shaft by a screw, $h$. This crusher revolving above sieve I stirs up the material, crushing the soft lumps.

I is a sieve armed with a small collar in center, fitting round the protruding end of shaft G and over the cross-piece K. It also rests on the cover O of casing J, and is provided with pins or hooks $i$, fitting into sockets on O, and forming the equivalent of a bayonet-joint when the sieve is turned round till the pins enter the sockets.

J is a casing, forming the main chamber of the mixer, and having an exit-orifice, L, armed with a slide, $n$.

M is the lid covering the sieve I. It is fitted with a hopper, N, and regulating-slide $m$.

P are arms or beaters, keyed or otherwise fastened onto and forming part of shaft G, and, revolving with it, thoroughly mix the materials falling through the sieve.

Q are legs for supporting the apparatus.

The mode of action is as follows: The apparatus being fitted up, as shown in the drawings, the hopper N is filled, the slide $m$ drawn back, and the sieve filled. The driving-shaft is then put in motion. The screw or crusher H stirs the stuff about over the sieve, crushing the softer lumps. As the material descends below the sieve it is thoroughly mixed, and then let out through the orifice L and slide $n$.

I claim as my invention—

1. In a crushing and mixing machine, the combination of the body, the screen located at or near the top, the vertical shaft extending through the screen, the oblique crushing-blades attached to the shaft immediately above the screen, and the mixing-blades attached to the shaft beneath the screen, as described and shown, whereby the material is first crushed and forced through the screen, and subsequently agitated and mixed by the action of the blades beneath the screen.

2. In a mixing-machine, the combination of the horizontal driving-shaft B, capable of sliding longitudinally in its bearings with bevel-gear wheel E, gearing into bevel-wheel E' on vertical shaft F below, and a clip device, D, arranged so that it shall, when in position, prevent shaft B from moving horizontally, and if thrown out of gear will leave the shaft B to slide on its bearings sufficient to enable the shaft F to be withdrawn upward from its bearings, substantially as described.

3. The combination of shaft F with its lower part socketed into shaft G below and passing through a ring, hole, or collar in sieve I, and the screw or crusher H, held immovably, or nearly so, by the set-screw $h$ passing through a slot in the hub of H, open above, in such manner that the shaft F can be withdrawn and replaced without disturbing the sieve or even the crusher H.

4. The shaft G, coupled to shaft F in such manner that any rotary motion of the one entails an equal and similar motion in the other, while the shaft F can be freely raised vertically from it, in combination with the stirrers P, rigidly fixed to and preferably formed in one with shaft G, and the bearings of shaft G, rigidly fixed to the casing, and a cross-piece, K, fitted to the casing, so that the mixing-stirrers shall run evenly with the casing, and yet they and shaft G can be quickly dismantled by taking off the cross-piece K and raising vertically.

5. In a mixing-machine, the combination of the sieve I with a protected hole in the center to allow the central shaft to pass, and the bayonet-joint formed of the pins $i$ and their sockets.

PHILIP HENRY BRACHER.

Witnesses:
  CHARLES JAMES CAINS,
  CHARLES LISBY,
    *Clerks to Messrs. Aldridge & Aldridge, Solicitors, Poole.*